Aug. 27, 1957 H. BECKER ET AL 2,804,142
DEVICE FOR CUTTING LENGTHS FROM ELONGATED, IN
PARTICULAR TUBULAR, MATERIAL
Filed Sept. 15, 1954 5 Sheets-Sheet 3
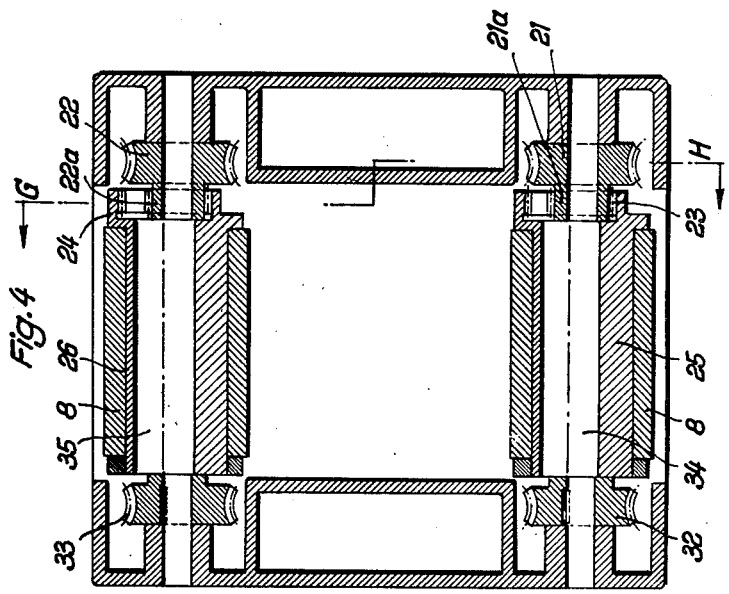
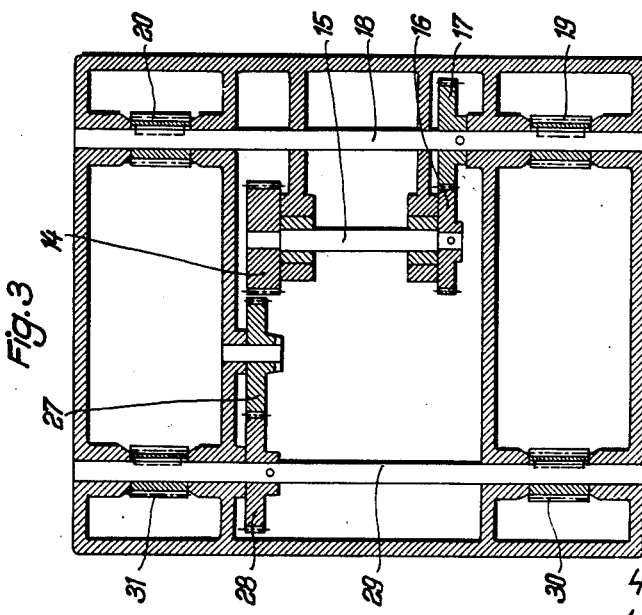
INVENTORS
BY
ATTORNEY

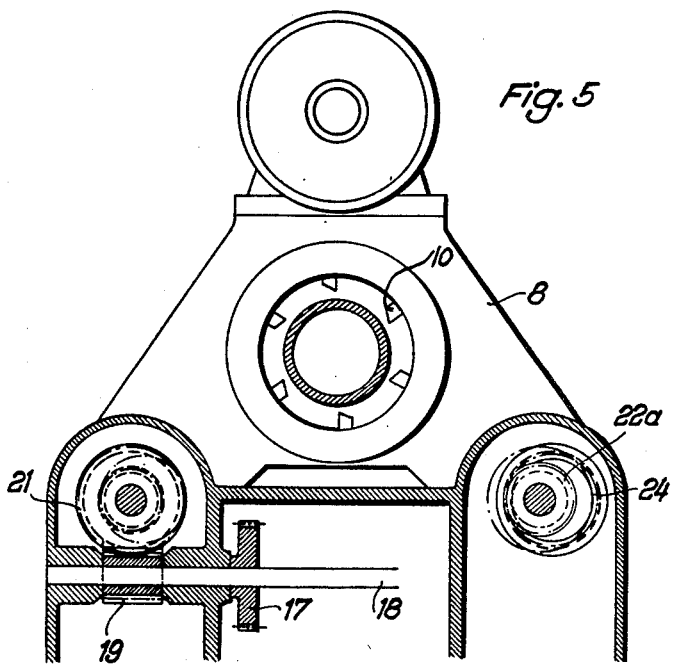
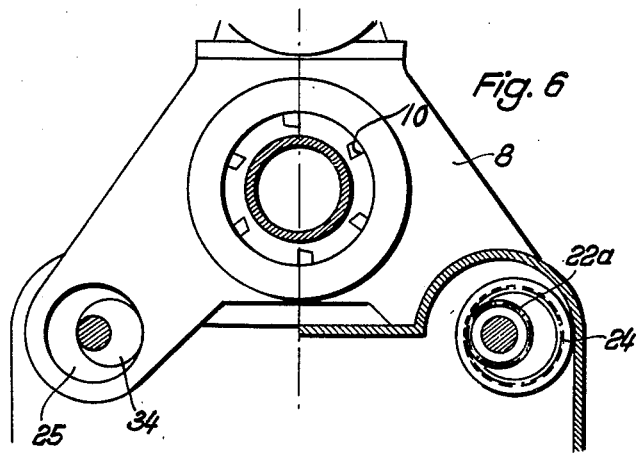

Aug. 27, 1957 H. BECKER ET AL 2,804,142
DEVICE FOR CUTTING LENGTHS FROM ELONGATED, IN
PARTICULAR TUBULAR, MATERIAL
Filed Sept. 15, 1954 5 Sheets-Sheet 5

INVENTORS:
Hans Becker & Theodor Nupper
BY Armand E. Mentern
Attorney

United States Patent Office 2,804,142
Patented Aug. 27, 1957

2,804,142

DEVICE FOR CUTTING LENGTHS FROM ELONGATED, IN PARTICULAR TUBULAR, MATERIAL

Hans Becker and Theodor Noppen, Dusseldorf-Heerdt, Germany; said Noppen assignor to said Becker Application September 15, 1954, Serial No. 456,206

Claims priority, application Germany September 17, 1953

5 Claims. (Cl. 164—60)

There is a known cut-off machine with internally placed cutting tools, wherein the tool element, during the cut-off operation, revolves upon a center eccentrically located with respect to the centerline of the part to be cut, the said center being displaced about the centerline of the stationary tubular work by means of a feed mechanism such that the frame bearing the tool element is driven by two cranks with adjustable throws. In the known machine, the pins of the cranks are at first in a position concentric with their drive shafts. During the cycle of operation, they are uniformly adjusted to increasing crank radius by feed means provided on their shafts, while the two cranks are in uniform rotation.

In addition to the fact that the resetting of crank pins required during the cycle of operation is a difficult problem calling for complex devices, these known cut-off machines are subject to disadvantages in operation; for, while the tool element is being eccentrically revolved about the work to be cut, by means of the cranks, its cutting tools gradually enter, spirally as it were, deeper and deeper into the work, until finally, in the last crank revolution, the work is actually cut off. In this process, the tools always act almost tangentially on the work, so that they are obliged to cut chips commencing at an extremely unfavorable angle, with zero chip thickness.

The invention is intended to overcome the disadvantages mentioned and provide favorable chip conditions in that the eccentricity of the crank pins is initially set to a favorable value for purposes of chip formation and detachment, the eccentrics or cranks not being set in rotation until a later point. Accordingly, the invention relates to a device for cutting lengths from elongated, in particular tubular, material, wherein an annular tool element equipped with several cutting tools revolves, during the cut-off operation, upon a center eccentrically located with respect to the centerline of the tubular work, the said center being displaced about the centerline of the said stationary work by means of a feed mechanism, such that the frame bearing the tool element is driven by two cranks with adjustable throws; and consists substantially in that each of the cranks comprises an eccentric shaft rotatable in an eccentric bearing, and the said shaft and bearing are in each instance displaceable by means of a common mechanism.

In practicing the invention, the arrangement may advantageously be such that only one mechanism permanently connected with one of the adjusting means, for example the eccentric bearings, is provided, this mechanism being connectable to the other adjusting means, for example the eccentric shafts, by means of a disengageable coupling. Adjustment of eccentricity of the two cranks is in that case effected by turning one adjusting system, the cranks being set in rotation by connecting the other adjusting system to the drive as well.

The drive for the eccentric bearings rotatable on the eccentric shafts is provided, according to the invention, in that each eccentric bearing is fitted with an internal gear concentric with its bore, which gear is engaged by a pinion mounted on the stub of the corresponding eccentric shaft. For rotation of the eccentric bearings and shafts, worm gears may advantageously be provided, preferably of self-locking type.

As a result of the fact that in the device according to the invention, the eccentric feed movement does not begin until after the tool, by virtue of its eccentric setting, has already penetrated the work to the depth required for parting, the individual cutting tools have a very favorable angle of entry for cutting the chips. This advantage becomes fully effective especially when the tool element of the device is provided with a sufficiently small number of cutting tools so that during the cut-off process, only one tool is in the cut at a time. As a result, with low setting pressure, heavy chips are obtained, of thickness decreasing from the point of entry in the direction of the cut, and therefore of similar shape to the chips obtained in downcut milling. The low setting pressure required with only one tool in the cut, and the high cutting speed, prevent any deformation of the work, even in the case of thin-walled hollow stock.

An embodiment of the invention is illustrated in the accompanying drawings, wherein—

Fig. 3 shows a section along the line C—D in Fig. 1;

Fig. 4 shows a section along the line E—F in Fig. 2, in a position corresponding to Fig. 3;

Fig. 5 shows a view of the machine in the direction of the arrow P in Fig. 1, the lower portion of the machine being in section along the line G—H in Fig. 4;

Figs. 6–8 are views as in Fig. 5, corresponding to different phases of operation of the machine.

Figure 1:
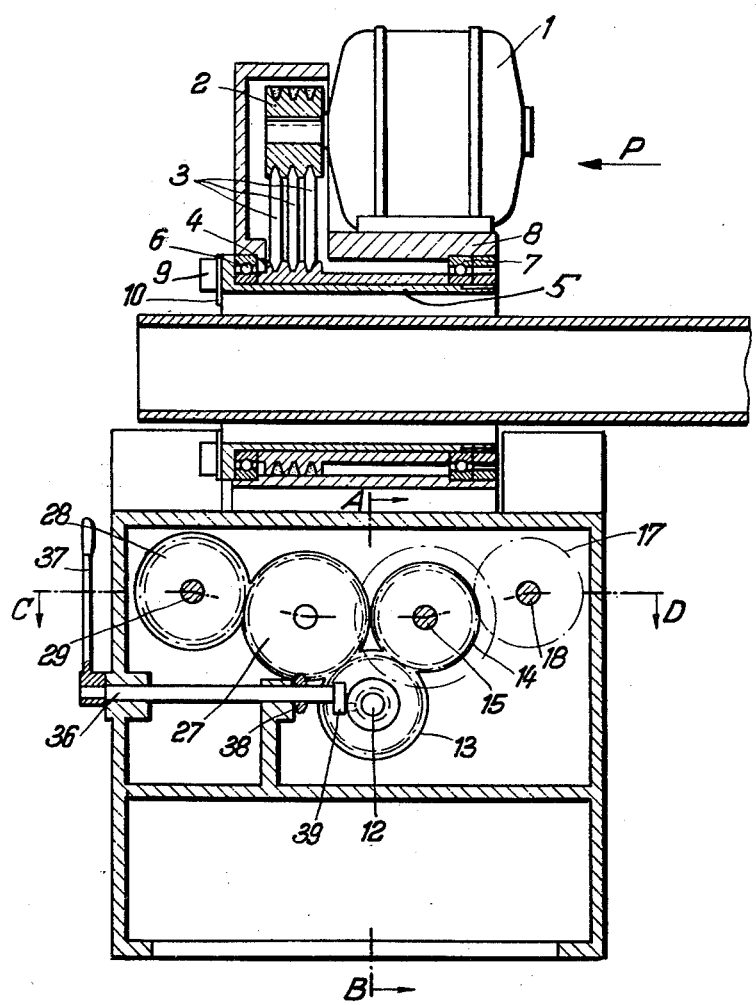
Fig. 1 shows a longitudinal section of a pipe-cutting machine.
Figure 2:
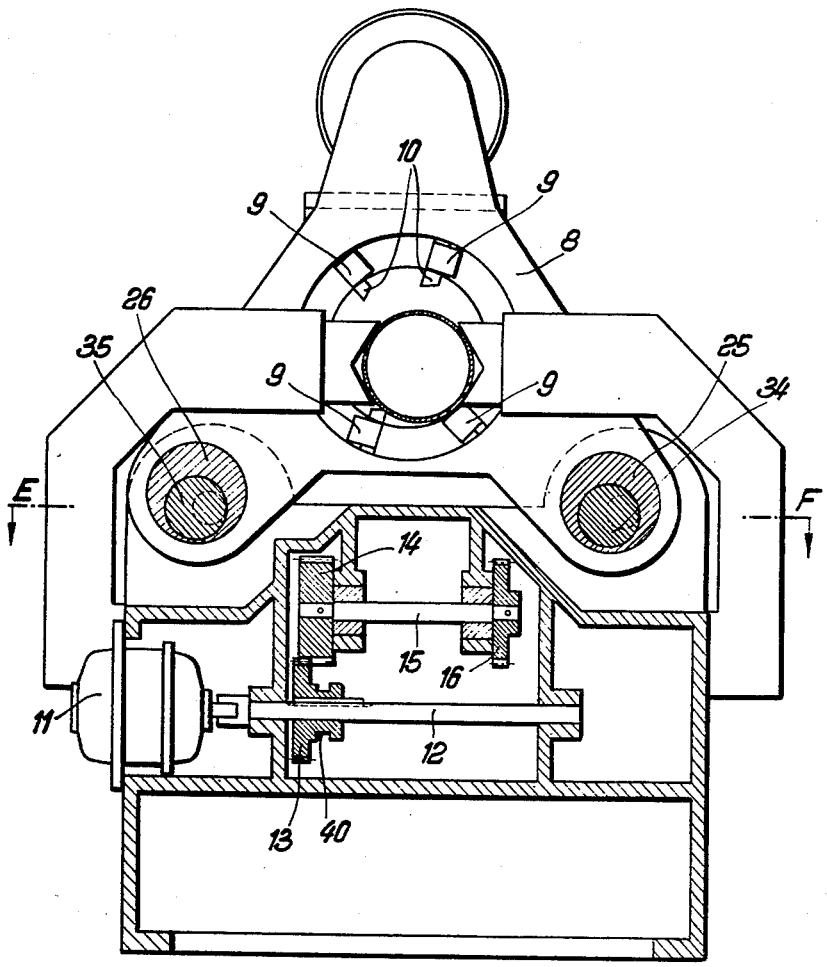
Fig. 2 shows a view of the machine from the left, the lower portion of the machine being in section along the line A—B in Fig. 1.

The machine as shown in Figs. 1 and 2 comprises a supporting framework and a tool holder mounted thereon. The framework accommodates the drive and a gear for adjustment and control of the movements of the tool holder. The tool holder contains the revolving tool element and drive mechanism thereof. First, the surmounting tool holder will be described.

A motor 1 having a V-belt sheave 2 drives a sheave 4 by means of V-belts 3, the said sheave 4 being connected to a tubular sleeve 5. The sleeve 5 is rotatedly mounted by means of ball bearings 6 and 7 in the tool holder 8, and is provided at its left-hand face with clamps 9 to hold tools 10. The motor 1 rests on an upper surface of the tool holder 8. The tool holder 8 is of symmetrical construction, having two arms pointed obliquely downward, of the shape seen in the left-hand half of Fig. 6.

In the supporting framework of the machine, there is a motor 11, for example a flanged motor as in Fig. 2. This motor is connected by a clutch with a shaft 12 bearing a gear 13 longitudinally displaceable but not rotatable thereon. The gear 13 is in permanent engagement with a gear 14 of double width, connected by a shaft 15 with another gear 16. The gear 16, as shown in Fig. 3, engages a gear 17 connected by a shaft 18 with two worms 19, 20. The worms 19 and 20 are in engagement with the pinions 21 and 22 shown in Fig. 4. The pinions 21, 22 are each integral with a gear 21a and 22a, respectively. These gears engage internal gears 23, 24, of which gear 23 is mounted on an eccentric bearing 25, and gear 24 on an eccentric bearing 26.

Gear 13, in the position shown in Fig. 2, engages not only the double gear 14, but also another gear 27, intermediate between it and a gear 28 (Fig. 1). The gear 28 is on a shaft 29 and drives two worms 30, 31 (Fig. 3). The worms 30, 31 are in engagement with worm pinions 32, 33 (Fig. 4), each of which is coupled with an eccentric shaft 34 or 35, respectively. The stubs of eccentric shafts 34, 35 bear the worm gears and pinions 22, 22a and 21, 21a, respectively, in rotatable condition; the eccentric portions of shafts 34, 35 bear eccentric bearings 25, 26. The internal gears 23, 24 of eccentric bearings 25, 26 are concentric with the bores of the bearings. Eccentric bearings 25, 26 carry the oblique, downward pointed arms of the tool holder 8.

By shifting gear 13 on shaft 12, the latter can be brought out of engagement with the intermediate gear 27. For this purpose, a crank 39 provided on a shaft 36 engages a groove 40 in the hub of gear 13. Shaft 36 bears a lever 37 by means of which crank 39 may be actuated. Shaft 36 also bears a locking member 38 which, upon setting of the lever 37, is so displaced that when gear 13 is thrust to the right, in the sense of Fig. 2, it engages the teeth of intermediate gear 27 and secures it against rotation; whereas in the position of gear 13, shown in Fig. 2, it is swung out of locked position.

The eccentricities of eccentric shafts 34, 35 and eccentric bearings 25, 26 are equal, so that the eccentric position of the bores in the tool holder 8 relative to the stubs of eccentric shafts 34, 35 can be adjusted between zero and the sum of the eccentricities of the eccentric shafts and bearings by rotating these parts relative to each other.

The machine described serves for cutting lengths from hollow stock. The hollow material to be cut up, for example a pipe, is clamped in the machine in a position in which it is fed into the machine from a conveyor or the like. It may be clamped by means of any known type of fixture, which may be operable by hand or by means of a pressure medium. In Fig. 2, such a clamping means is indicated merely schematically; no details are shown, these being irrelevant to the invention.

The machine described operates as follows. After insertion of the pipe to be cut, the latter is clamped by means of the fixture, the tool holder 8 being in the position shown in Figs. 5 and 6, where the cutting tools 10 do not interfere with insertion of the pipe. Then, the motor 1 is switched on, thus causing rotation of sleeve 5 with tools 10. Before the other motor 11 is switched on, the hand lever 37 is actuated to shift gear 13 to the right, in the sense of Fig. 2 so as to cease to be in engagement with gear 27.

Figure 7:
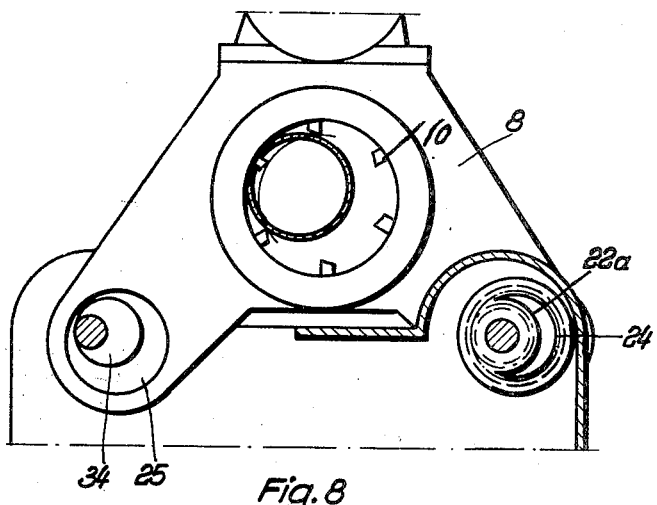

As soon as motor 11 is switched on, the two worms 19, 20 are driven by gears 13, 14 and 16, 17, so that the worm gears 21, 22 and pinions 21a, 22a will turn internal gears 23, 24, and hence also the eccentric bearings 25, 26. Consequently, the two bores of the tool holder 8 are placed eccentrically to the stubs of the eccentric shafts 34, 35. In this manner, the tool head 5, 9, 10 is likewise moved eccentrically to the pipe to be cut, so that its tools 10 cut into the work. This process is illustrated in Fig. 7. In the left-hand part of Fig. 7, it is shown that the eccentric bearing 25 has been turned from its initial position shown in Fig. 6 through about 135° counterclockwise with respect to the eccentric shaft 34. Despite this rotation, the gears 21a, 22a remain in engagement with the internal gears 23, 24, since the latter are placed concentrically to the bores of eccentric bearings 25, 26. This may be seen in the right-hand part of Fig. 7.

When the cutting tools 10 have penetrated the work to a sufficient depth, the lever 37 is actuated and the drive for worms 30, 31 connected by a shift of gear 13. Consequently, motor 11 now turns the eccentric shafts 34, 35 also. Since the transmission ratios for worms 19, 20 and worms 30, 31 are identical, eccentric shafts 34, 35 and bearings 25, 26 will now turn jointly at the same rotational speed. The selected resultant eccentricity is thus preserved, and the tool holder 8 is so revolved about the work, in accordance with the adjusted crank radius, that the tool element will move eccentrically about the centerline of the pipe to be cut and progressively cut off the pipe circumferentially.

Figure 8:
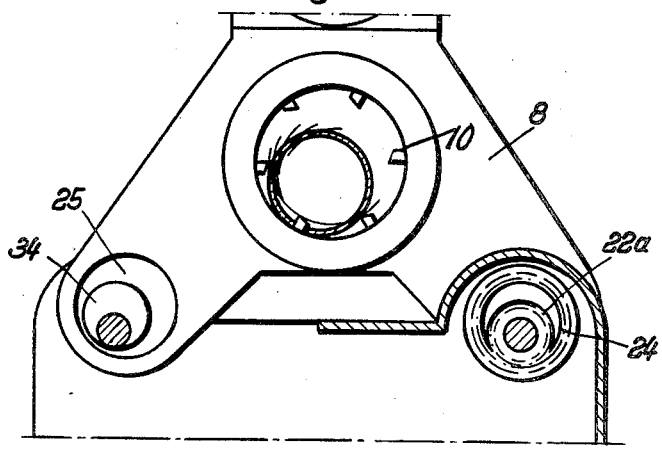

As Figs. 7 and 8 show, in the course of this cutting process, the individual tool bits 10 act on the work at a favorable angle, with resulting favorable chip formation. Since the individual bits 10 remain in the cut for only a short period, there is a comparatively large proportion of time in which they can cool. Consequently, the rotational speed of the cutter head can be very high, so that extraordinarily high cutting speed can be obtained with the machine according to the invention. Since, during the cutting, there is penetration of the wall of the tubular stock to be cut throughout, the formation of a continuous burr is avoided, thus practically eliminating breakage of tool bits.

What we claim is:

1. A device for cutting lengths from tubular and other elongated material, comprising a supporting framework, a clamping device for the elongated material, an annular tool with a plurality of cutters at the inner periphery, said tool enclosing said elongated material, a tool holder for supporting said annular tool to be rotatable around its central axis, a drive means for rotating said tool, two cranks mounted on the supporting framework and engaging with their crank shafts in recesses of the tool holder, each of said cranks having an eccentric shaft rotatable in an eccentric bearing, drive means for rotating the two eccentric bearings in the same sense of rotation and other drive means for driving the two eccentric shafts in the same direction and at the same speed with the eccentric bearings, whereby the radii of the two cranks are commonly adjustable by one of said drive means and that upon simultaneous operation of both drive means both cranks are uniformly rotated so that the tool holder has a motion imparted thereto whereby the axis of rotation of the tool will move on a cylindrical path around the axis of the elongated material.

2. A device according to claim 1 wherein a common motor is used for operation of said first and of said second drive means, and a disengageable coupling is provided which permits the alternative operation of one or both drive means by said motor.

3. A device according to claim 2 wherein said drive means include for each eccentric bearing an internal gear concentric with the bore of said bearing, and a pinion, provided on the stub of the corresponding eccentric shaft, mounted for rotation thereon, said pinion being in engagement with said internal bore.

4. A device according to claim 3 in which both the first drive means and the second drive means comprise two worms and worm gears.

5. A device according to claim 1, which comprises a cutter head having such a number of bits that during the cutting operation only one bit is cutting at a time.

References Cited in the file of this patent

UNITED STATES PATENTS

| | | |
|---|---|---|
| 1,507,235 | Hall | Sept. 2, 1924 |
| 1,657,295 | Bark et al. | Jan. 24, 1928 |
| 1,807,671 | Phelps | June 2, 1931 |
| 2,038,254 | Worthington | Apr. 21, 1936 |
| 2,139,682 | Hothersall | Dec. 13, 1938 |
| 2,691,921 | Burgsmuller | Oct. 19, 1954 |

FOREIGN PATENTS

| | | |
|---|---|---|
| 862,605 | France | Sept. 9, 1940 |